United States Patent [19]

Durston et al.

[11] 4,022,656

[45] May 10, 1977

[54] SUSPENDED NUCLEAR REACTOR CONTAINMENTS WITH REDUCED THERMAL STRESS

[75] Inventors: John Graham Durston, Northwich; John Richard Hind, Warrington, both of England

[73] Assignee: United Kingdom Atomic Energy Authority, London, England

[22] Filed: Aug. 20, 1974

[21] Appl. No.: 498,919

[30] Foreign Application Priority Data

Sept. 28, 1973 United Kingdom ............. 45543/73

[52] U.S. Cl. .................................. 176/38; 176/65; 176/87; 52/224; 52/225; 52/248
[51] Int. Cl.² ....................................... G21C 9/00
[58] Field of Search ............. 176/38, 65, 87, 92 A, 176/40; 52/224, 285, 230, 248

[56] References Cited
UNITED STATES PATENTS 3,108,935  10/1963  Penning et al. .............. 176/92 A X
3,296,085  1/1967   Peck et al. ....................... 176/87 X
3,371,017  2/1968   Coast et al. ...................... 176/87
3,389,516  6/1968   Ziegler ............................. 176/87 X
3,568,384  3/1971   Cruset et al. .................... 176/87 X
3,733,760  5/1973   Koerner ........................... 176/87 X
3,830,695  8/1974   Sauvage .......................... 176/38
3,888,730  6/1975   Jackson .......................... 176/87 X Primary Examiner—Samuel W. Engle
Assistant Examiner—Peter A. Nelson
Attorney, Agent, or Firm—Larson, Taylor and Hinds

[57] ABSTRACT

A containment for a nuclear reactor has a primary vessel for containing the reactor core and liquid coolant. The primary vessel is suspended by its rim from the roof of the containment structure. To reduce thermal stress at the suspension joint, cooling means is provided for the upper peripheral regions of the primary vessel. The cooling means comprises an annular tank containing liquid metal and heat-exchange coils, thermal insulation of varying thickness and a cooling jacket for the thermal insulation.

3 Claims, 2 Drawing Figures

SUSPENDED NUCLEAR REACTOR CONTAINMENTS WITH REDUCED THERMAL STRESS

BACKGROUND OF THE INVENTION

This invention relates to containments for nuclear reactors.

SUMMARY OF THE INVENTION

According to the invention a containment for a nuclear reactor comprises a pre-stressed concrete structure having a steel lined cavity with a substantially hemispherical base and housing a primary vessel for containing a nuclear reactor core and ancilliary equipment generally submerged in liquid coolant, the primary vessel being suspended by attachment at its rim to the roof lining and to steel anchors in the roof structure concrete, and wherein there is cooling means for the upper peripheral region of the primary vessel, the cooling means being arranged so that the rate of cooling increases progressively upwards to a maximum at the attachment of the primary vessel with the roof lining. During operation of the reactor the liquid coolant is at high temperature, for example, when the core is a fast neutron reactor operating with liquid sodium coolant, the temperature of the coolant in the vicinity of the wall of the primary vessel is approximately 400° C. The cooling means serves to reduce the temperature of the primary vessel in the region above the surface of the liquid coolant so that stresses at the attachment of the rim with the roof lining are low.

In a preferred construction of containment there is cooling means associated with the roof lining of the cavity the cooling means comprising a layer of high thermal conductivity concrete having cooling fluid conducting means embedded therein and disposed in close proximity with the interface of the high conductivity concrete and the structural concrete and spaced from the roof lining. By varying the rate of flow of cooling fluid through the conducting means the temperature gradient across the high conductivity concrete can be varied to control the operating temperature of the roof lining during normal operation and also maintain acceptable structural concrete temperatures in a post accident condition.

Where the reactor coolant is liquid metal and cooling fluid conduction means is provided for maintaining the structural concrete at optimum temperature the means may comprise closed ducts bounded by channels formed in the cavity defining concrete and by the steel lining of the cavity, the ducts extending vertically to above the level for the surface of the reactor coolant in the primary vessel and having inlet and outlet connections for gas coolant also disposed above the level for the surface of the reactor coolant in the primary vessel.

In the unlikely event of an emergency condition arising wherein molten fuel causes a breach of the primary vessel and cavity lining and subsequent penetration of some of the cooling channels, leaked sodium is not able completely to close off the concrete cooling system.

DESCRIPTION OF THE DRAWINGS

A constructional embodiment of the invention will now be described, by way of example, with reference to the accompanying drawings wherein.

DESCRIPTION OF THE PREFERRED EMBODIMENTS

Figure 1:
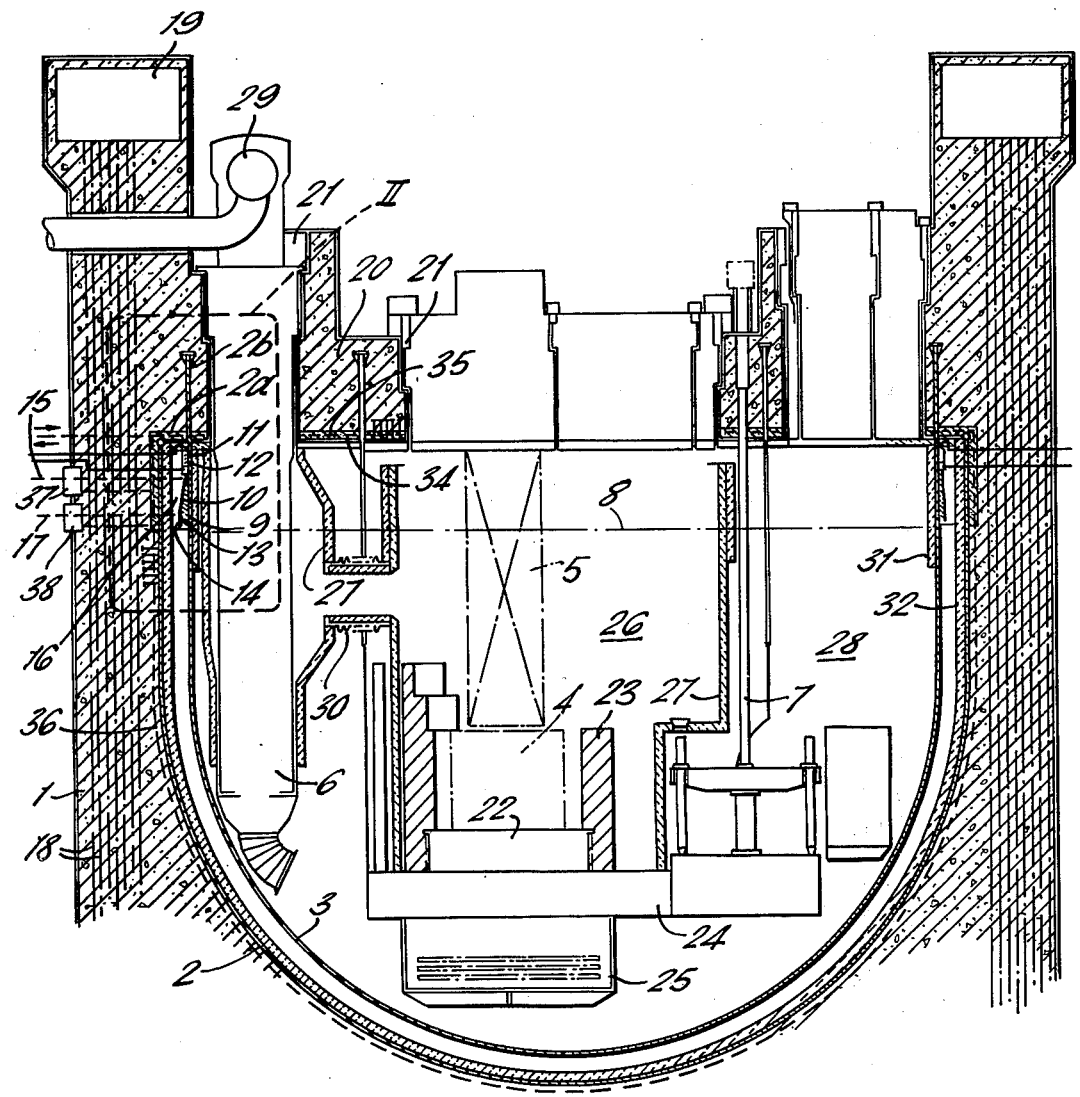
FIG. 1 is a sectional view of a nuclear reactor containment and FIG. 2 is an enlarged detail of part of FIG. 1 enclosed by the broken line and designated II.
Figure 2:
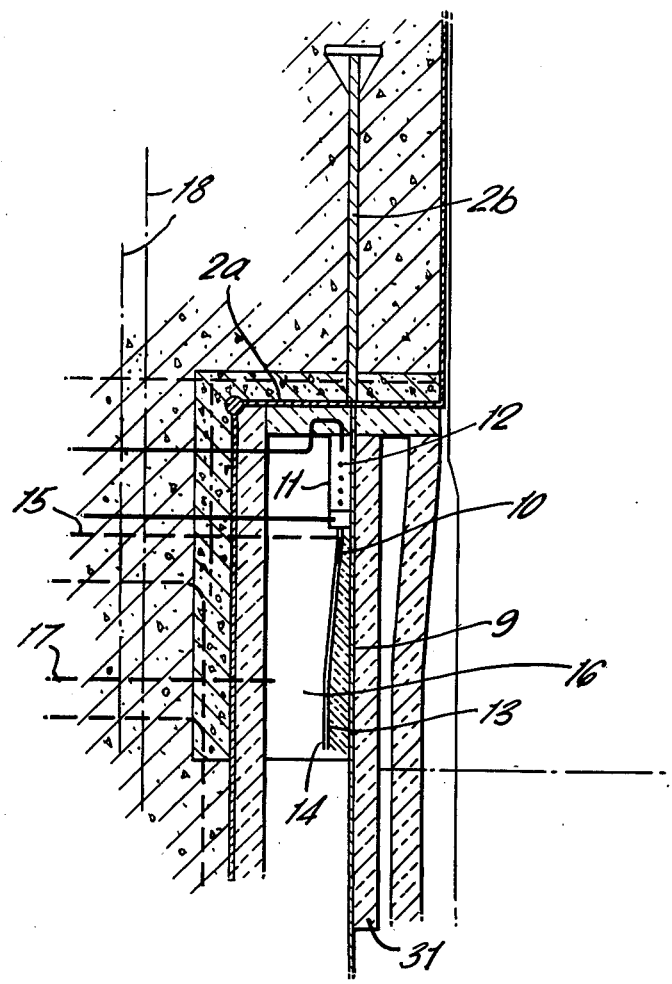

In FIG. 1 there is shown a pre-stressed concrete structure 1 having a steel lined cavity 2 housing a primary vessel 3. The primary vessel contains a fast neutron nuclear reactor core 4 with ancilliary equipment, such as control rods, 5, heat exchangers 6 (one only being shown) and fuelling apparatus 7, generally submerged in liquid sodium the surface level of which is designated 8. The primary vessel is suspended by attachment at its rim to the roof lining 2a and steel anchors 2b embedded in the roof structure concrete. The upper peripheral region 9 of the primary vessel has cooling means 10 (shown in greater detail in FIG. 2). The cooling means includes an annular tank 11 containing liquid sodium and potassium through which cooling liquid comprising a eutectic mixture of diphenyl and diphenyl oxide is passed by way of cooling coils 12 and heat exchange apparatus (not shown) outside the tank. Below the annular tank the primary vessel is lagged with mineral insulation 13 which reduces in thickness towards the rim of the primary vessel and the insulation is embraced by a jacket 14 which is fed with nitrogen by way of a line 15. The jacket 14 discharges into a chamber 16 which has an outlet line 17. The inlet and outlet lines are connected to heat exchange apparatus not shown in the drawing. The inside surface of the primary vessel from the roof liner down to just below the sodium free surface is insulated with layers of stainless steel sheet designated 31.

In use, the temperature of the liquid coolant (sodium) within the primary vessel varies between approximately 400° C at operating temperature and 200° C during refuelling operations and, in general, the resultant variations in thermal expansion can be accommodated by swelling and contraction of the vessel. However the induced stresses in the upper region 9 of the vessel become progressively more complex because of the restraint to expansion put upon the rim by its rigid attachment to the concrete roof slab. By varying the rate of flow of coolant through the heat exchange coils 12 in the annular tank 11 and rate of flow of nitrogen through the jacket 14, the upper region 9 of the primary vessel can be cooled at a controlled rate to maintain the induced stresses well below the maximum values specified in the design codes.

In greater detail and referring again to FIG. 1 the prestressed concrete structure 1 has pre-stressing tendons 18 which are pre-tensioned in stressing galleries 19 disposed at the top and bottom of the structure. The structure 1 has an integral roof 20 which has penetrations 21 for rotating plugs (for fuelling and control purposes) and to give access to the heat exchangers 6. The reactor core 4 is supported on a diagrid 22 which, together with neutron shielding 23, is supported by a strongback 24 suspended from the roof structure. Below the strongback there is a tray 25 for retention of debris falling from the reactor core. The sodium contained by the primary vessel comprises an inner pool 26 bounded by steel insulation 27 and an outer pool 28. The inner pool contains the reactor core 4 whilst the outer pool contains the heat exchanger 6, the fuelling apparatus 7 and the unillustrated coolant pumps and valves. The heat exchangers 6 have inlet pores 29 and outlet ports (not shown) for secondary coolant which also is sodium and which are connected to steam raising heat exchange apparatus outside the core. Flow of primary coolant is by way of the coolant pumps to the lower face of the reactor core 4 thence upwardly and to the heat exchangers 6 by way of expandible couplings 30. After passing over heat exchange tubes containing the secondary coolant the primary coolant passes from the bottom of the heat exchangers 6 into the outer pool 28. A layer of concrete 34 of high thermal conductivity is interposed between the concrete structure and the steel lining of the roof and upper region of the chamber above the normal level 8 of sodium. Cooling pipes 35 are arranged in close proximity with the interface between the concrete 34 and the structural concrete for conducting a flow of a eutectic mixture of diphenyl and diphenyl oxide. By varying the rate of coolant flow through the pipes 35 the temperature gradient across the concrete 34 can be controlled such that during normal operation acceptable liner temperatures are maintained and under post accident conditions acceptable structural concrete temperatures are maintained.

In the lower regions of the chamber the structural concrete and steel liner are cooled by a flow of nitrogen substantially at atmospheric pressure through cooling channels 36 formed in the concrete. The channels 36 are arranged vertically and are passed round the hemispherical base of the vessel in chevron pattern so that in combination with the steel lining they form a series of nested 'U' shaped ducts. The inlet and outlet manifolds of the ducts designated 37 and 38, are disposed above the normal sodium level so that, under post accident conditions, in the event of sodium and molten fuel escaping from the primary vessel and burning through the lining to the extent that one or more of the ducts are filled, the manifolds would remain open. Thus the adjoining unfilled ducts would provide adequate cooling for the structural concrete. The inside face of the lined cavity 2 is clad with mineral insulation designated 32.

We claim:

1. A containment for a nuclear reactor comprising:

a pre-stressed concrete structure, defining a cavity having a substantially hemispherical base and a horizontal plane roof, a steel membrane lining for the cavity, a primary vessel for containing a nuclear reactor core and ancillary equipment generally submerged in liquid coolant, the primary vessel being suspended by attachment at its rim to the roof lining and to steel anchors in the roof structure concrete, an annular tank for containing liquid metal in contact with the external surface of the upper peripheral region of the primary vessel and having cooling coils for passing a first coolant fluid through the tank in heat exchange with the liquid metal, thermal insulation of varying thickness disposed about the primary vessel below the annular tank, the thermal insulation reducing in thickness towards the rim of the primary vessel, and a jacket embracing the thermal insulation, the jacket having inlet and outlet connections for a second coolant fluid.

2. A containment according to claim 1 wherein there is cooling means associated with the roof lining of the cavity, the cooling means comprising a layer of high thermal conductivity concrete having cooling fluid conducting means embedded therein and disposed in close proximity with the interface of the high conductivity concrete and the structural concrete and spaced from the roof lining.

3. A containment according to claim 2 having cooling fluid conduction means for maintaining the structural concrete at optimum temperature, the fluid conduction means comprising a series of discrete, parallel, U-shaped ducts having vertically extending legs, the ducts being bounded by channels formed in the cavity defining concrete and by the steel membrane lining of the cavity, the ducts extending vertically to above the level for the surface of the reactor coolant in the primary vessel and having inlet and outlet connections for gas coolant also disposed above the level for the surface of the reactor coolant in the primary vessel.

* * * * *